US005712480A

United States Patent [19]

Mason

[11] Patent Number: 5,712,480
[45] Date of Patent: Jan. 27, 1998

[54] TIME-OF-FLIGHT DATA ACQUISITION SYSTEM

[75] Inventor: Michael Charles Mason, St. Joseph, Mich.

[73] Assignee: Leco Corporation, St. Joseph, Mich.

[21] Appl. No.: 558,783

[22] Filed: Nov. 16, 1995

[51] Int. Cl.[6] .............................. B01D 59/44; H01J 49/00
[52] U.S. Cl. .............................. 250/287; 250/282
[58] Field of Search .............................. 250/281, 282, 250/287

[56] References Cited

U.S. PATENT DOCUMENTS

| | | | |
|---|---|---|---|
| 3,870,881 | 3/1975 | Halliday et al. | 250/283 |
| 3,916,187 | 10/1975 | Roy | 250/287 |
| 4,472,631 | 9/1984 | Enke et al. | 250/281 |
| 4,490,806 | 12/1984 | Enke et al. . | |
| 4,970,390 | 11/1990 | Szymczak | 250/287 |
| 5,175,430 | 12/1992 | Enke et al. . | |
| 5,367,162 | 11/1994 | Holland et al. . | |
| 5,463,219 | 10/1995 | Buckley et al. | 250/281 |

FOREIGN PATENT DOCUMENTS 2274197A 7/1994 United Kingdom .

OTHER PUBLICATIONS

Holland, J.F., et al; *Design, Construction, and Evaluation of an integrating transient recorder for data acquisition*, Rev. Sci. Instrum. 62 (1) Jan. 1991.

Steffens, P., et al; A Time–of–Flight Mass Spectrometer for Static Sims Applications, Journal of Vacuum Science & Technology A, SEcond Series, vol. 3, No. 3; Part II, May/Jun. 1985.

Kristo, M.J., et al; System for Simultaneous Count/Current, Measurement With Dual–Mode Photon Particle Detector, Rev. Sci. Instrum. 59 (3), Mar. 1988.

Kawatoh, E., et al., *Analysis of Sputtered Neutrals by Nonresonant Multiphoton Ionization* Japanese Journal of Applied Physics, Mar. 1991, vol. 30, No. 3.

Hudor, A.M.; Past Electronics for Time–of–Flight Measurements, Rev. Sci. Instrum. 52(6), Jun. 1981.

Kutscher et al., *A Transversally & Longitudinally Focusing Time–of–Flight Mass Spectrometer, Journal of Mass Spectrometry Ion Physics*, vol. 103, p. 117 (1991).

Wiley and McLaren, Rev. Sci. Instrum., vol. 26, p. 1150 (1955).

Mamyrin et al., Soviet Physics, J.E.P.T., vol. 37, p. 45 (1973).

Benninghoven et al., Organic Mass Spectrometry, vol. 12, p. 593 (1977).

Karas et al., International Journal of Mass Spectrometry Ion Proceedings, vol. 92, p. 231 (1989).

O'Harleron et al., Technical Document Report No. ASD TDR 62 644, Parts I and II (1964).

Dodonov et al., Book of Abstracts from the Twelfth International Mass Spectrometry Conference, Amsterdam (1991).

Coles et al., Proceedings of the Forthieth ASMS Conference on Mass Spectrometry and Applied Topics vol. 10 (1992).

Boyle et al., Analytical Chemistry, vol. 64, p. 2084 (1992).

Myers and Hieftje, Michrochemical Journal (1993).

(List continued on next page.)

*Primary Examiner*—Bruce Anderson
*Attorney, Agent, or Firm*—Price, Heneveld, Cooper, DeWitt & Litton

[57] ABSTRACT

A system intended for use in time-of-flight mass spectroscopy for detecting at least one ion species in an ion spectra including a signal acquisition circuit for detecting the ions in the spectra and generating output signals indicative thereof, a sequence and storage control circuit for tagging certain ones of the signals to be stored, a memory circuit for storing the output signals tagged by the sequence and storage control circuit, and a digital signal processor circuit receiving the tagged signals from the memory for summing the tagged data and generating an output signal indicative of a value of the ion species detected. A method for collecting the data is also disclosed.

27 Claims, 12 Drawing Sheets

OTHER PUBLICATIONS

Cameron, A.E.; Eggers, D.F.: Rev. Sci. Instrum., vol. 19, p. 605 (1948).

Futrell et al., *Modification of Time–of–Flight Mass Spectrometer for investigation of Ion–Molecule Reactions at Elevated Pressures,* Rev. Sci. Instrum., vol. 39, No. 3, p. 340 (1968).

Miller et al., *Improvement of Spectral Baseline Stability for a Time–of–Flight Mass Spectrometer Operated at Elevated Pressures,* Rev. Sci. Instrum., vol. 39, No. 3, p. 503 (1969).

Studier, Martin, *Continuous Ion Source for a Time–of–Flight Mass Spectrometer Rev. Sci. Instrum.,* vol. 34, No. 12 p. 1367 (1963).

Di Valentin and Dove, *Satellite Mass Peaks in Time–of–Flight Mass Spectrometry of Ions Continuously Sampled From an External Source,* International Journal of Mass Spectrometry and Ion Physics, p. 359 (1973).

Fowler and Good, *A Theory on Obtaining Short Bursts of Ions from a Beam of Ions,* Nuclear Instruments and Methods, vol. 7, p. 245 (1960).

Sanzone, George, *Energy Resolution of the Conventional Time–of–Flight Mass Spectrometer* Rev. Sci. Instrum., vol 41, No. 3, p. 741 (1970).

Pinkston et al., *New Time of Flight Mass Spectrometer for Improved Mass Resolution, Versatility, Mass Spectrometry Studies,* Rev. Sci. Instrum., vol. 57 (4), p. 583 (1986).

Cotter, R.G., *Electrospray Ionization on a Reflecting Time–of–Fligh Mass Spectrometer,* ACS Book (1994).

Gohl et al., *Time–of–Flight Mass Spectrometry for Ions of Large Energy Spread,* International Journal of Mass Spectrometry and Ion Physics, vol. 48, p. 411 (1983).

Boesl, et al., *A High–Resolution Time–of–Flight Mass Spectrometer with Laser Desorptioin and a Laser Ionization Source,* Analytical Instrumentation, vol. 16(1), p. 151 (1987).

Bakker, J. M. B., *A Beam–Modulated Time–of–Flight Mass Spectrometer; Part I: Theoretical Considerations, Scientific Instruments,* vol. 6, NO. 8, p. 677 (1973).

Mamyrin and Shmikk, *The Linear Mass Reflection,* Soviet physics, J.E.P.T., vol. 49(5) (1979).

Bakker, J.M.B., *A Beam–Modulated Time–of–Flight Mass Spectrometer; Part II: Expirementai Work,* Scientific Instruments, vol. 7, No. 5, p. 364 (1974).

Yefchak et al., *Beam Deflection for Temporal Encoding in Time–of–Flight Mass Spectrometry,* Journal of American Society for Mass Spectrometry, vol. 1 No. 6 (1990).

Ma, C. et al., *The Design of an Atmospheric Pressure Ionization/Time–of–Flight Mass Spectrometer Using a beam Deflection Method,* Rev. Sci. Instrum., vol. 63, p. 139 (1992).

Van Breemen et al., *Time–Resolved Laser Desorption Mass Spectrometry, Journal of Mass Spectrometry and Ion Physics,* vol. 49, No. 1 (1983).

Olthoff et al., *Liquid Secondary Ion Time–of–Flight Mass Spectrometry,* Analytical Chemistry, (1987).

Bergmann et al., *High–Resolution Time–of–Flight Mass Spectrometer,* Rev. Sci. Instrum., vol. 60, No. 4 (1989).

Grix, et al., *A Time–of–Flight Mass Analyzer wityh High Resolving Power,* Physikalisches Institut der Justus–Liebig–Universitat, West Germany (1988).

Karataev et al., *New Method for Focusing Ion Bunches in Time–of–Flight Mass Spectrometers, Soviet Physics–Technical Physics,* vol. 16 No. 7 (1972).

Bakker, J.M.B., *The Time–Focusing Principle: A Double–Focusing Design for Time–of–Flight Mass Spectrometers, Journal of Mass Spectrometry and Ion Physics,* vol. 6 No. 314 (1971).

Poschenrieder, W.P., *Multiple–Focusing Time–of–Flight Mass Spectrometers Part II: TOFMS with Equal Energy Acceleration,* Journal of Mass Spectrometry and Ion Physics, vol. 9, No. 4 (1972).

Kinsel and Johnston, *Post Source Pulse Focusing: A Simple Method to Achieve Improved Resolution in a Time–of–Flight Mass Spectrometer,* Int'l Journal of Mass Spectrometry and Ion Processes, vol. 91 (1989).

Dawson and Guilhaus, *Orthogonal–Acceleration Time–of–Flight Mass Spectrometer,* Rapid Communications in Mass Spectrometry, vol. 3, No. 5 (1989).

Li, G., Myers, D.P., and Hieftje, G.M., Ion Optical Considerations and Design of a Time–of–Flight Mass Spectrometer for Sampling Ions from an Atmospheric Pressure Ionization Source.

Dodonov et al., *Electrospray Ionization on a Reflecting Time–of–Flight Mass Spectrometer,* ACS Book (1993).

Houk, R.S., Anal. Chem., vol. 58, No. 1, p. 97A (1986).

Green, L.W., Macdonald, R.G., and Sopchyshyn, F.C.; *Fast–Pulse Detection for Isotoic Abundance Determination by Resonance Ionization, Time–of–Flight Mass Spectrometry,* Analytical Instrumentation, 17(1&2), 195–214 (1988).

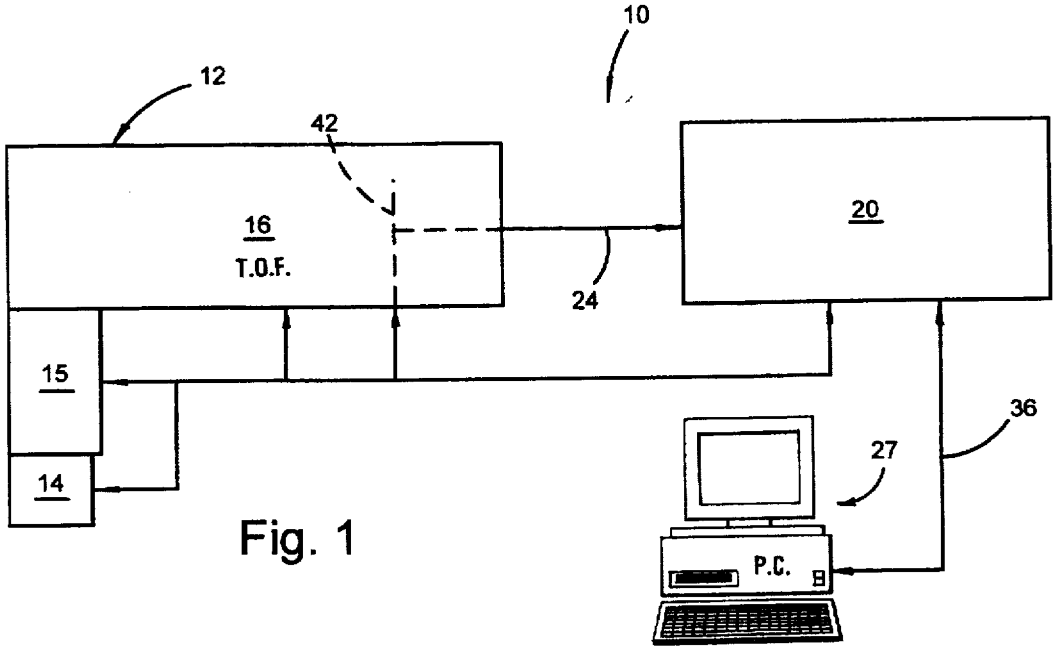
Fig. 1
Fig. 2
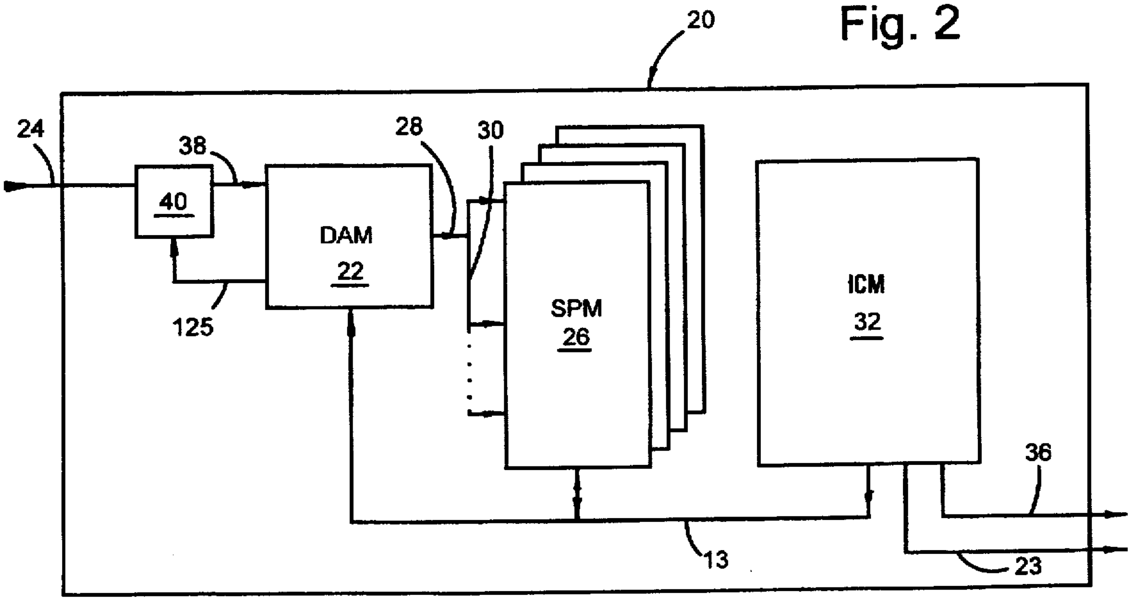

TIME-OF-FLIGHT DATA ACQUISITION SYSTEM

BACKGROUND OF THE INVENTION

This invention relates generally to the detection of ions in mass spectrometry, and more particularly to a data acquisition system including methods of operation and apparatus for determining ion abundances at pre-selected times intervals of one or more ionic spectra.

The science of mass spectrometry has been proven to be a valuable tool in analytical chemistry. Mass spectrometry is premised on the fact that electrically neutral molecules of a sample can be charged or ionized and their motion controlled by electric and magnetic fields. The response of a charged molecule to magnetic and electric fields is influenced by the mass-to-charge ratio of the ion so that ions of a specific mass-to-charge ratio can be selectively detected.

Mass spectrometers differ from each other primarily in the way in which ions of different mass-to-charge ratios are distinguished from each other. Magnetic sector mass spectrometers separate ions of equal energy by the ions' momentum as they are reflected or dispersed in a magnetic field. Quadrapole mass spectrometers separate ions based upon their rate of acceleration in response to a high frequency radio frequency field in the presence of a direct current field. Ion cyclotrons and ion trap mass spectrometers discriminate ions on the frequency or dimensions of their resonant oscillation in alternating current fields. Time-of-flight mass spectrometers discriminate ions according to their velocity over a fixed distance.

Although relatively straightforward in design, time-of-flight (hereinafter "TOF") mass spectrometers produce data at a very high rate. Because ions having different mass-to-charge ratios may be present in a single sample, they will strike the detectors at different times according to their velocity or kinetic energy. The detector output signal comprises a sequence of ion arrival responses which are compressed within a very short time interval, generally less than one-tenth of a micro-second. Within a hundred microseconds, all of the ions, including the heaviest, have traveled the length of the TOF spectrometer and arrived at the detector to produce a spectrum of this sample molecule. Up to as many as one million spectra may be produced for a given sampled analyzed. Additionally, these spectra may need to be separated into chronologically ordered sets. The time scale would be on the order of one millisecond.

Only a small segment containing certain ionic compounds of all of the data produced by the analysis of a given sample may be of interest. In the past, however, scientist had to collect data over the entire spectra produced by the sample. To reduce the amount of data produced, and to focus in on the ionic compound of interest, it has been proposed to turn the detection circuit on just prior to the predicted arrival time or window of a selected compound. Details of such a system are disclosed in U.S. Pat. No. 5,367,162, owned by the assignee of the invention. This patent also provides a thorough discussion of the prior art and its disclosure is incorporated herein by reference. However, none of the prior devices are capable of continuous and uninterrupted detection, collection, and processing of time-of-flight spectra. More specifically, none of the prior art devices detect and continuously convert the analog signals to digital signals for selection, summation, and processing using a compact system operating at a substantially reduced power level than heretofore achieved.

SUMMARY OF THE INVENTION

According to one aspect of the invention, an acquisition system is provided for detecting a plurality of ions in a TOF mass spectrometer and providing an output indicative of only select ions of interest. More particularly, the data acquisition system includes a detector or transducer for receiving the spectra of ions in a sample and producing data signals indicative of the ions received, a data acquisition module for tagging only certain ones of said data signals as signals of interest, and storing the data signals of interest temporarily. Also included is a signal processor for partially processing the data by summing the data of interest and storing it in a memory. Under predetermined conditions, the data in the signal processor are transferred to an instrument control where the data undergo additional processing.

According to another aspect of the invention, a data acquisition system is provided for TOF mass spectrometers, including a circuit for receiving a plurality of ions and having a continuous digital output indicative of said ions, a circuit operatively connected to said digital output for identifying certain ones of said digital output as including data of interest, and a memory circuit for temporarily storing tagged signals and discarding all others.

A method is also provided for detecting at least one ion in TOF mass spectrometry, comprising the steps of receiving a plurality of ions at a detector of a TOF mass spectrometer, generating a plurality of output signals in response to said ions received by the detector as a function of time, marking said plurality of signals as a function of time as signals to be stored and signals to be ignored, and summing said signals to be stored as a function of time.

The advantages provided by and resulting from the data acquisition system and method embodying the invention include the ability to collect and process data at more than twice the rate conventionally available. Additionally, resolution is significantly improved as a result of collecting larger segments of data over a shorter time interval than previously available. This results in sharper and better defined data sets than previously available, making it possible to discriminate between ion species mass-to-charge ratios previously undetectable. Furthermore, the data acquisition system and method embodying the invention provide the further advantage of ensuring that all of the particular data of interest are collected since all data is digitized and temporarily stored. In this manner, data is not lost as a result of powering up a system or digitizing circuit just after the ions of interest have already been partially detected. These and other features, objects, and advantages of the invention will become apparent upon a reading of the detailed description with reference to the appended drawing figures.

BRIEF DESCRIPTION OF THE DRAWING FIGURES

The various advantages offered by the present invention will become apparent by a reading of the specification and the attached claims, as well as reference to the following drawing figures herein:

FIG. 1 illustrates, in block diagram form, a TOF mass spectrometer embodying the invention;

FIG. 2 generally illustrates, in block diagram form, the principal components of a data acquisition system embodying the instant invention;

Figure 8:
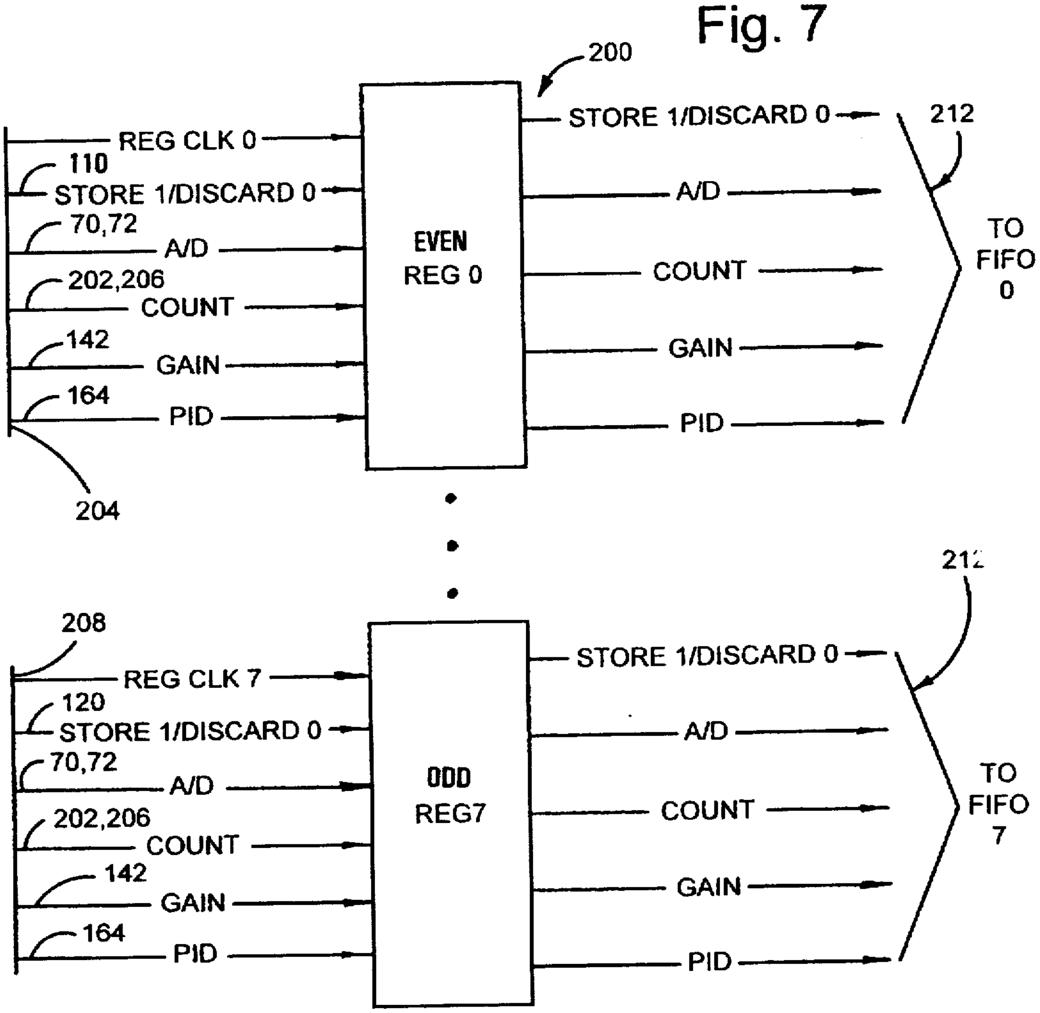
Figure 9:
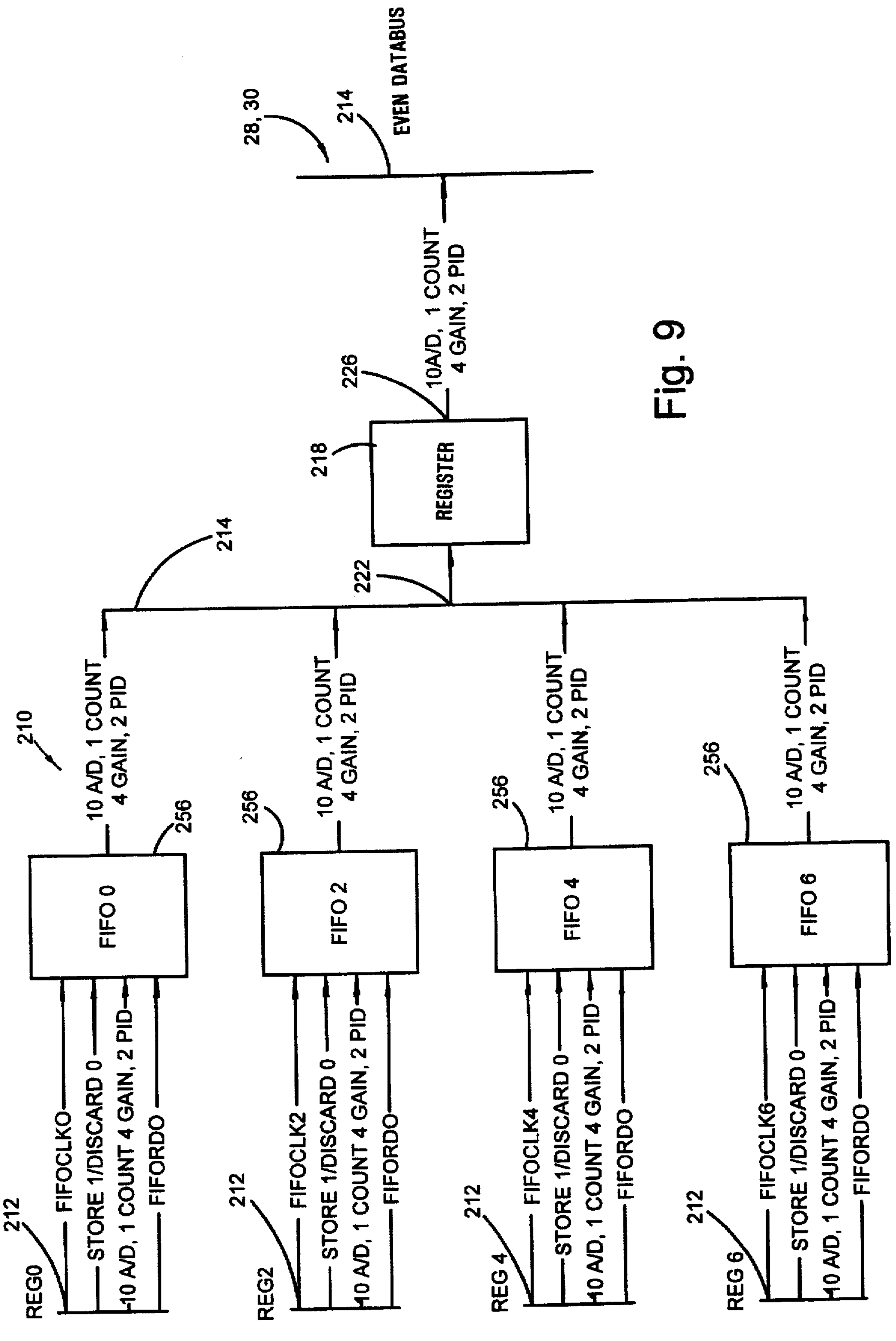
Figure 10:
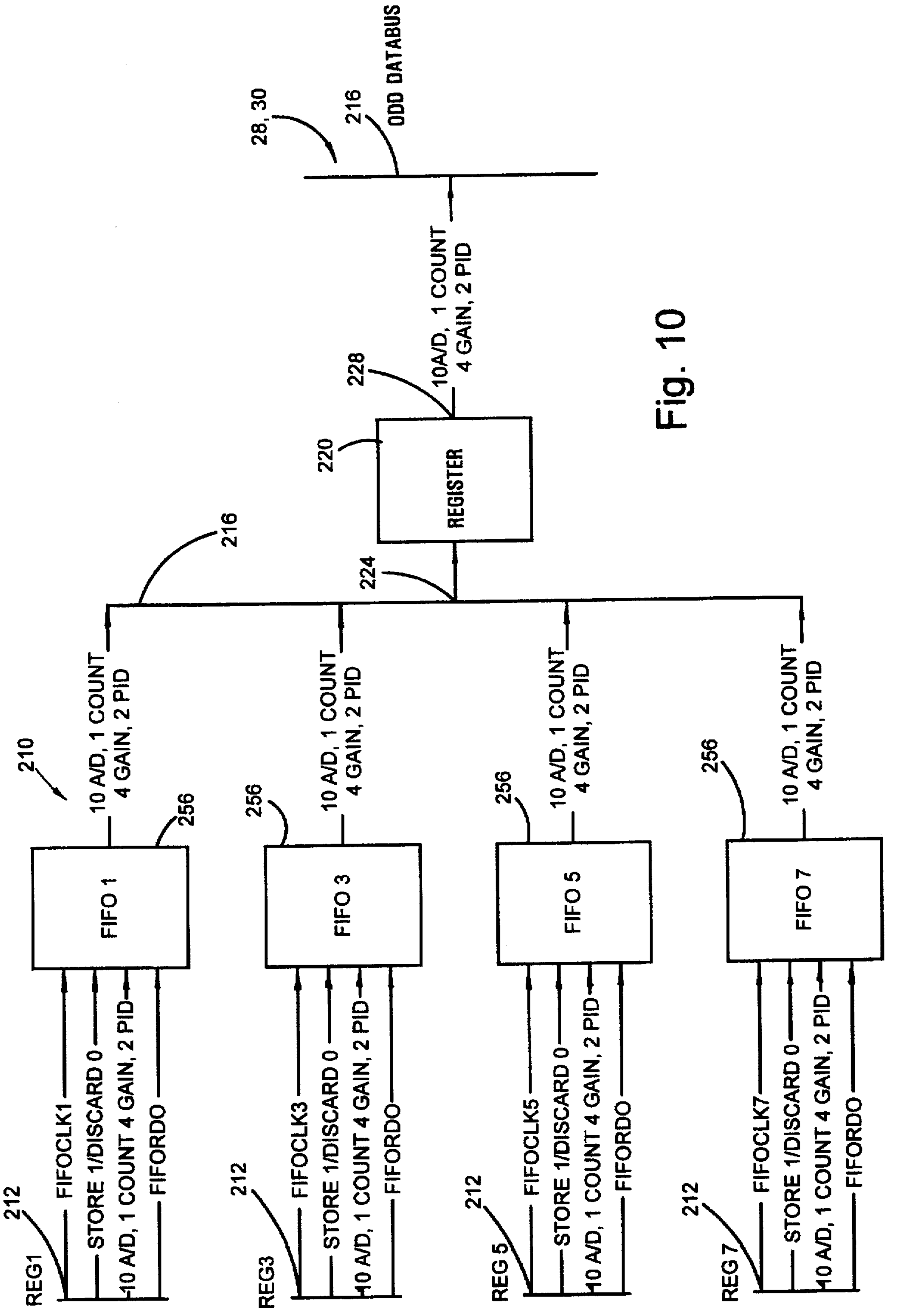
Figure 11:
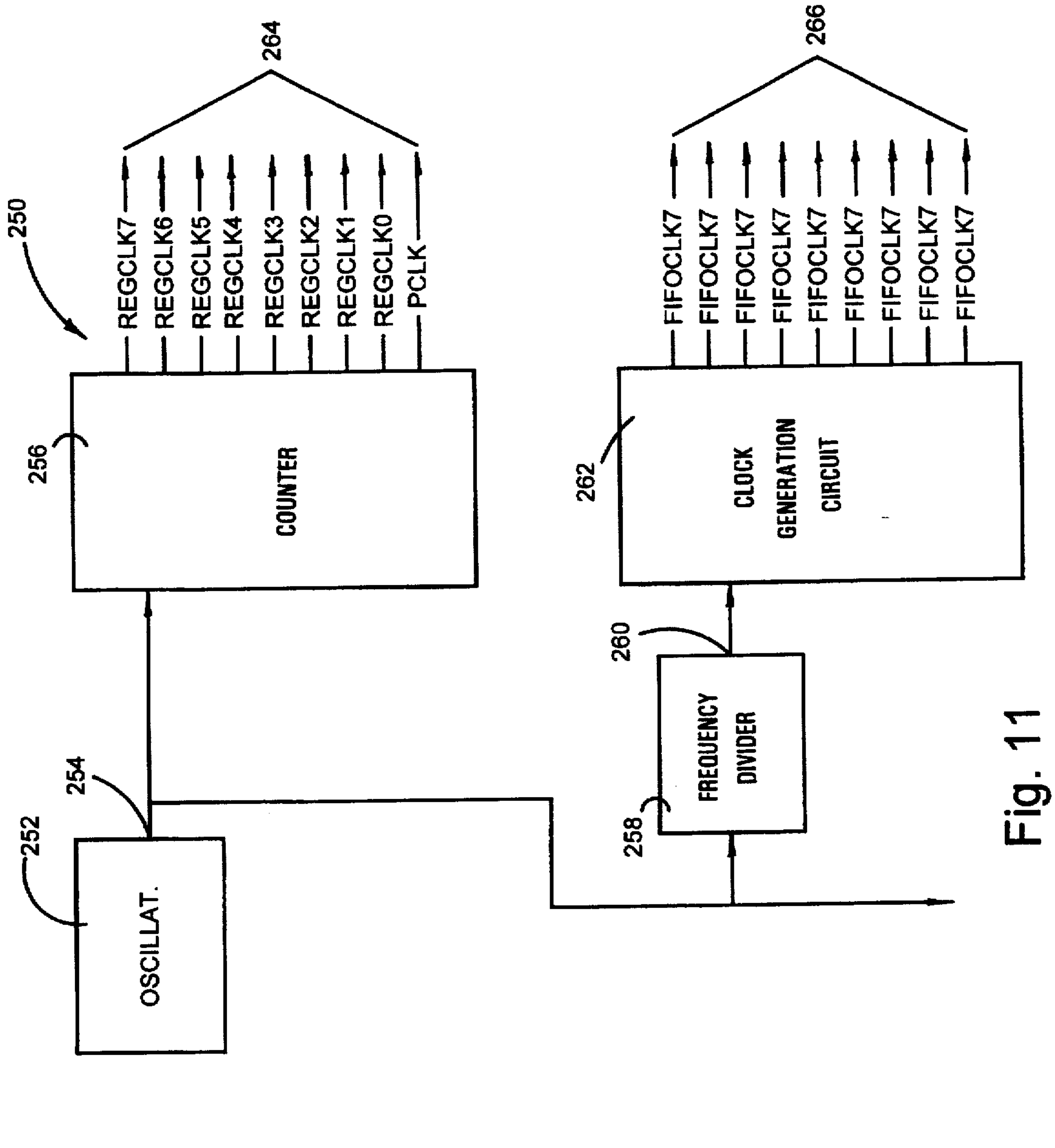
Figure 12:
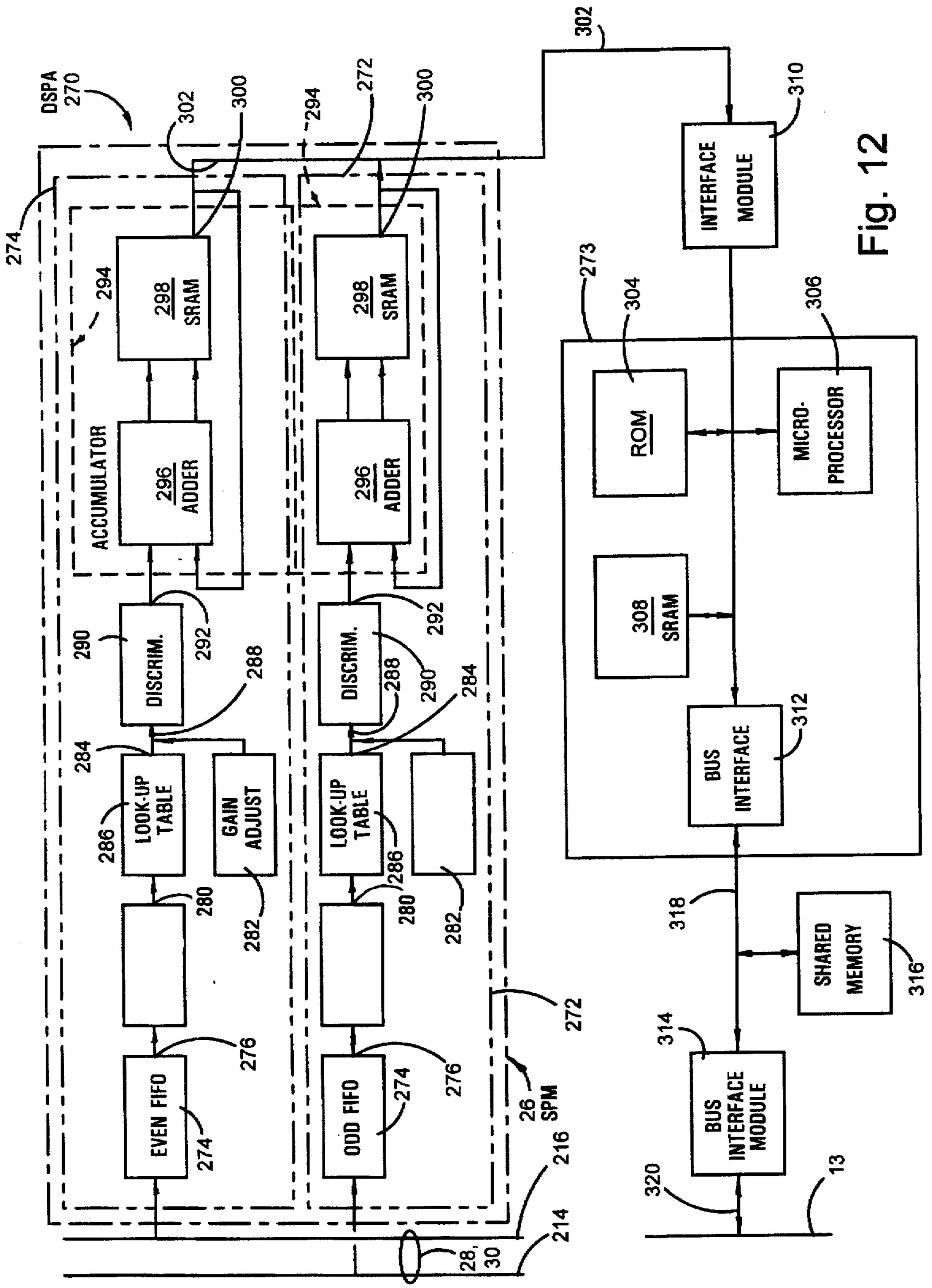
Figure 13:
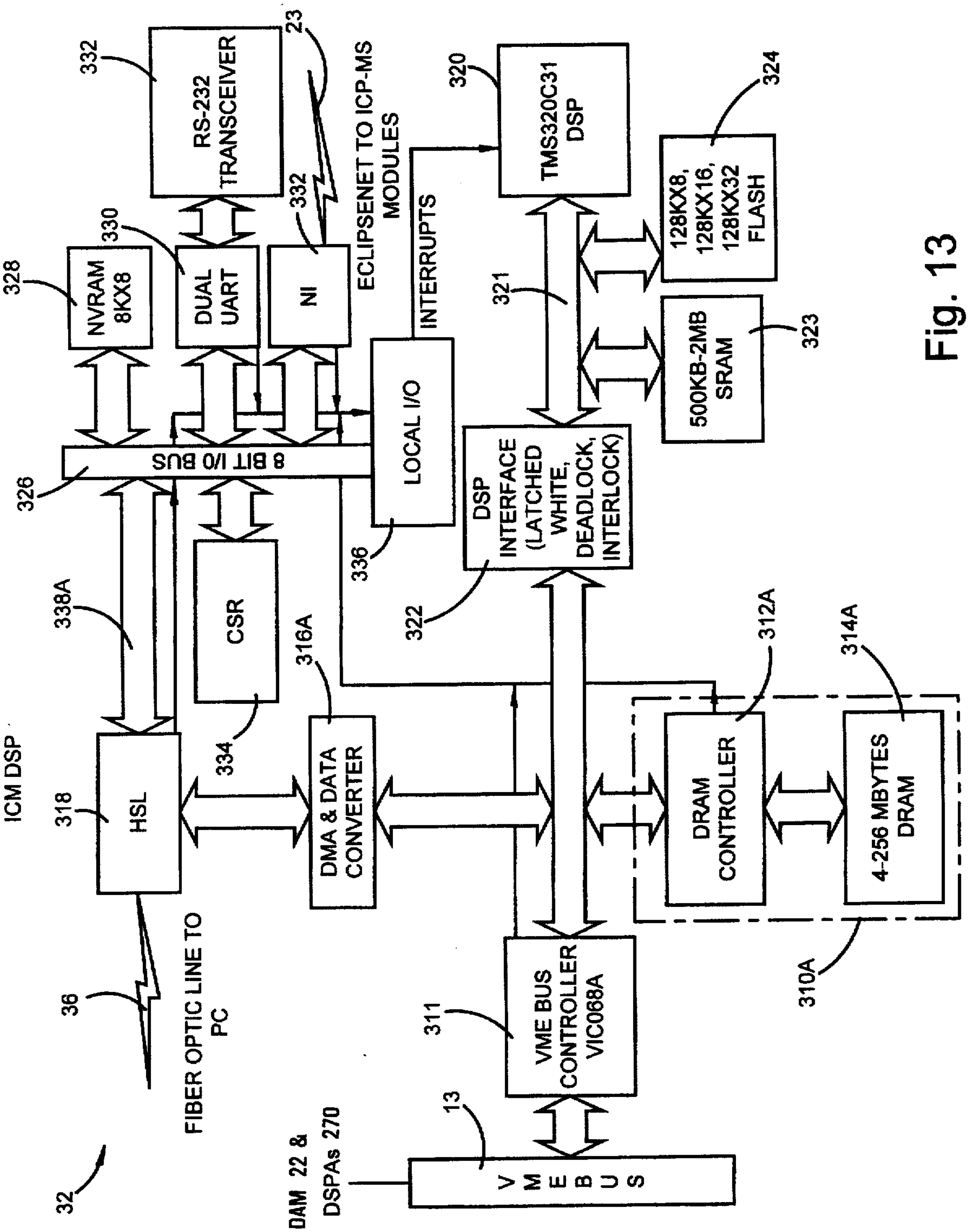
Figure 14:
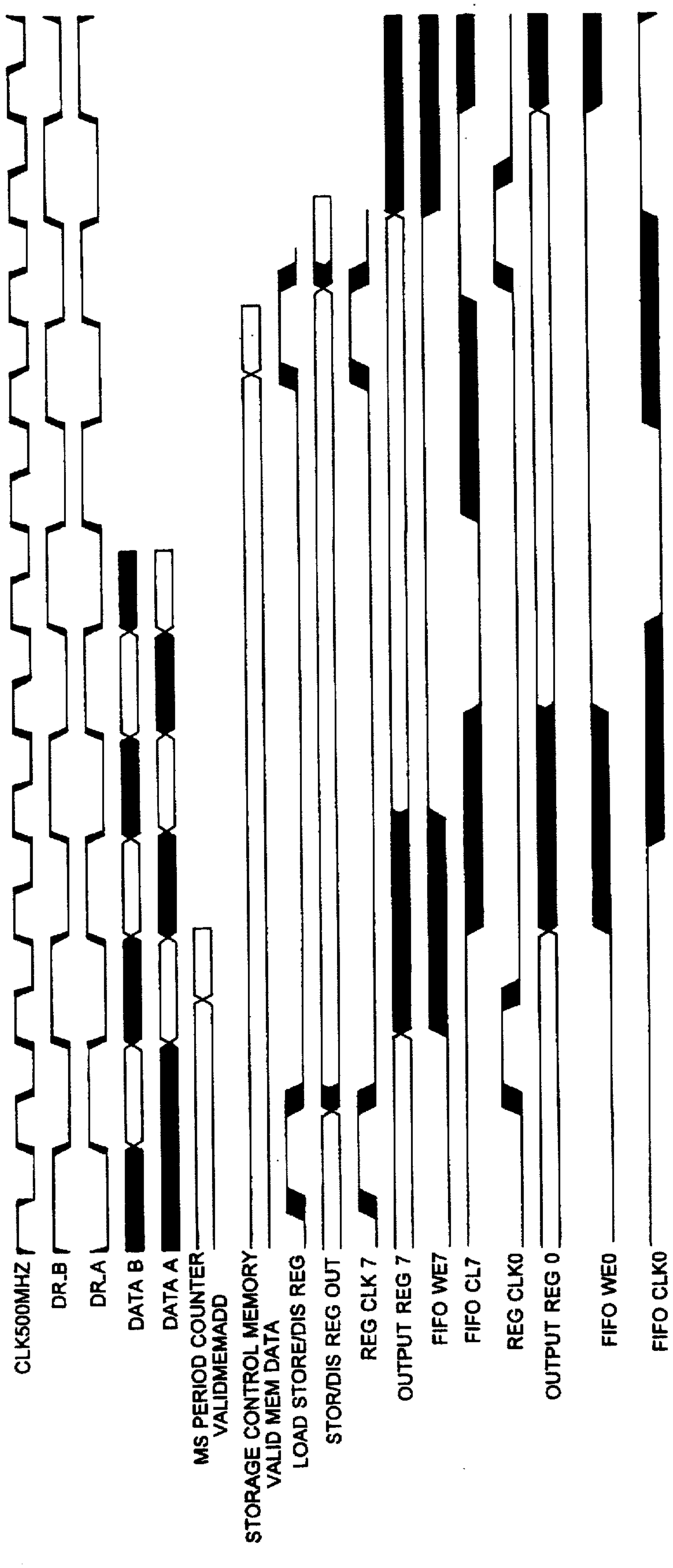

FIGS. 8, 9, and 10 are block diagrams generally illustrating a memory circuit employed in the present invention;

FIG. 11 is an electrical circuit in block diagram form generally illustrating a clock pulse generation circuit employed in the sequence and memory time base circuit;

FIG. 12 is an electrical circuit in block diagram form generally illustrating a digital signal process and accumulator circuit employed in the data acquisition system shown in FIG. 2;

FIG. 13 is an electrical circuit in block diagram form generally illustrating an instrument control module circuit;

FIG. 14 is a timing diagram of the preferred embodiment; and

Figure 4:
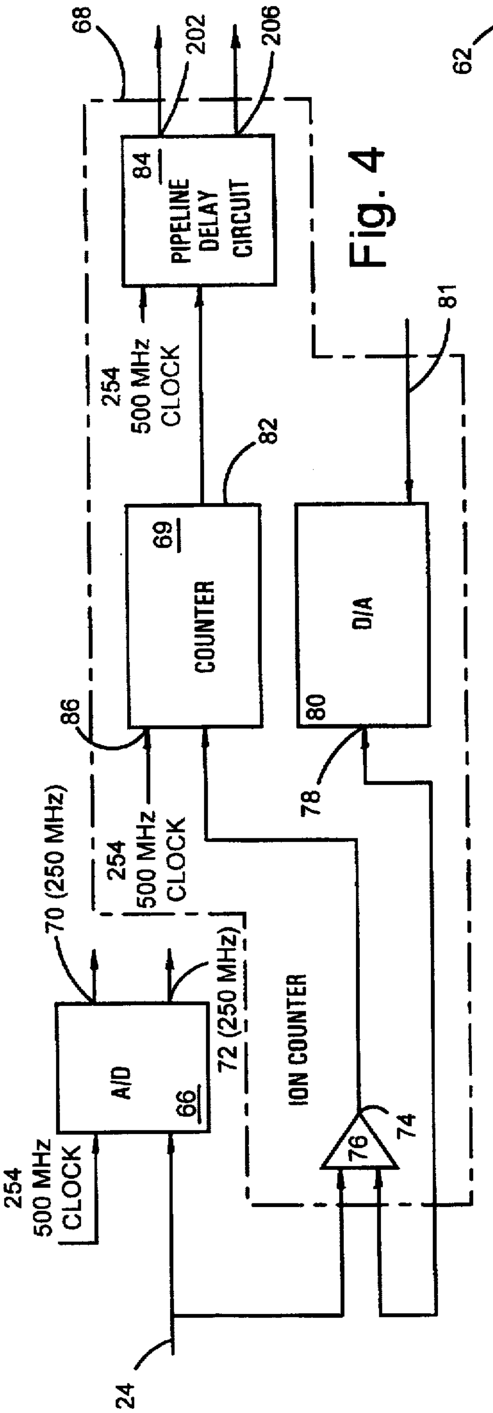
FIG. 4 is an electrical circuit in block and schematic form of a signal acquisition circuit employed in the system of the present invention.
Figure 15:
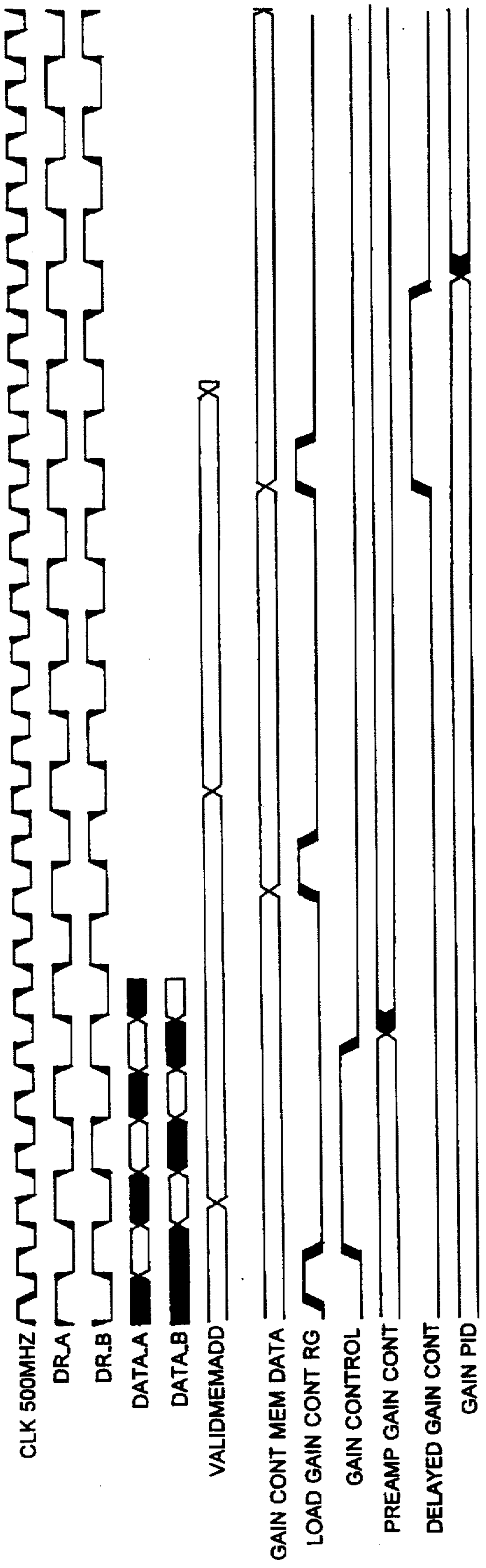

FIG. 15 is a timing diagram for controlling gain of the signal acquisition circuit shown in FIG. 4.

DETAILED DESCRIPTION OF THE PREFERRED EMBODIMENTS

Throughout the following description, reference will be made to several different drawing figures wherein similar or like components are identified by the same label or reference numeral. The multiple reference or element identification is provided as a way of connecting one circuit on one page to a companion circuit or element on a different page. In particular, and in reference to the drawing figures, FIG. 1 generally shows in block diagram form a TOF mass spectrometer system 10 embodying the instant invention. The spectroscope 10 includes a time-of-flight mass spectrometer 12, including, but not limited to, an orthogonal or on-axis flight tube configuration using any one of a number of sources 14, such as a gas chromatograph, a glow discharge source, an inductively coupled plasma source, or the like. For the purposes of example only, source 14 is disposed at one end of a sample chamber 15, orthogonal to a flight tube 16. Disposed at one end of the flight tube 16 is a detector or transducer 42, described in greater detail below. Detector 42 provides an analog output over line 24 to a data acquisition system 20 to record and process data produced by sensor 42. Furthermore, data acquisition system 20 provides one or more outputs along one or more lines, generally indicated as 23, to control operation of the mass spectrometer 12. Data acquisition system 20 is operably connected to a personal computer or other interface 27 through data lines or buses 36. Across buses or lines 36, the user may control substantially all of the operating parameters of spectrometer 12 as well as the data collection and processing procedures followed by data acquisition system 20.

Referring to FIG. 2, them is shown, for example, one embodiment of data acquisition system 20 for use with time array detection in TOF mass spectrometry. Generally, system 20 is comprised of four modules, including a pre-amplifier 40 connected to an ion detector 42 and a data acquisition module (DAM) 22 operatively connected to receive an analog input signal at 38 from pre-amplifier circuit 40, described below, a signal processor module (SPM) 26 operably coupled to receive a digital input signal from DAM 22 over buses 28 and 30, and an instrument control module (ICM) 32 configured to receive a digital output from SPM 26 over a bus 13. Instrument control module 32 is preferably interconnected with the other modules, such as 22 and 26, through line 13, specific modules of system 10 over lines 23, and a personal computer (PC) or other processor through data bus or line 36, as will be described in greater detail below.

Data acquisition system 20 is designed to provide control and sequencing of the operations of the TOF mass spectrometer, act as a centralized time base for spectrometer 12, collect and process data from ion detector 42, control the gain settings of the ion detector output pre-amplifier, and provide a set of time array data to PC or other processor 27. The principal advantage offered by the system described herein is that the entire analog input signal 24 is converted to a digital signal in DAM 22, for each sample or transient analyzed, as a function of time. The digital data collected during a particular instant or time interval of interest is labeled or tagged in DAM 22 to be stored for later processing. The digital data signals which are tagged or identified as not to be stored (or not labeled or identified as the case may be) are discarded by writing over the discarded data with new data. The tagged data signals are transferred by buses 28 and 30 to SPM 26 wherein the data are summed and pre-processed. DAM 22 and SPM 26 contain a plurality of dedicated registers and buses such that the data signals are divided and processed at a reduced duty cycle. The summed data are transferred by bus 13 to ICM 32 for additional processing and transmission to PC 27. Each of the components comprising system 20 are described in detail below.

Figure 6:
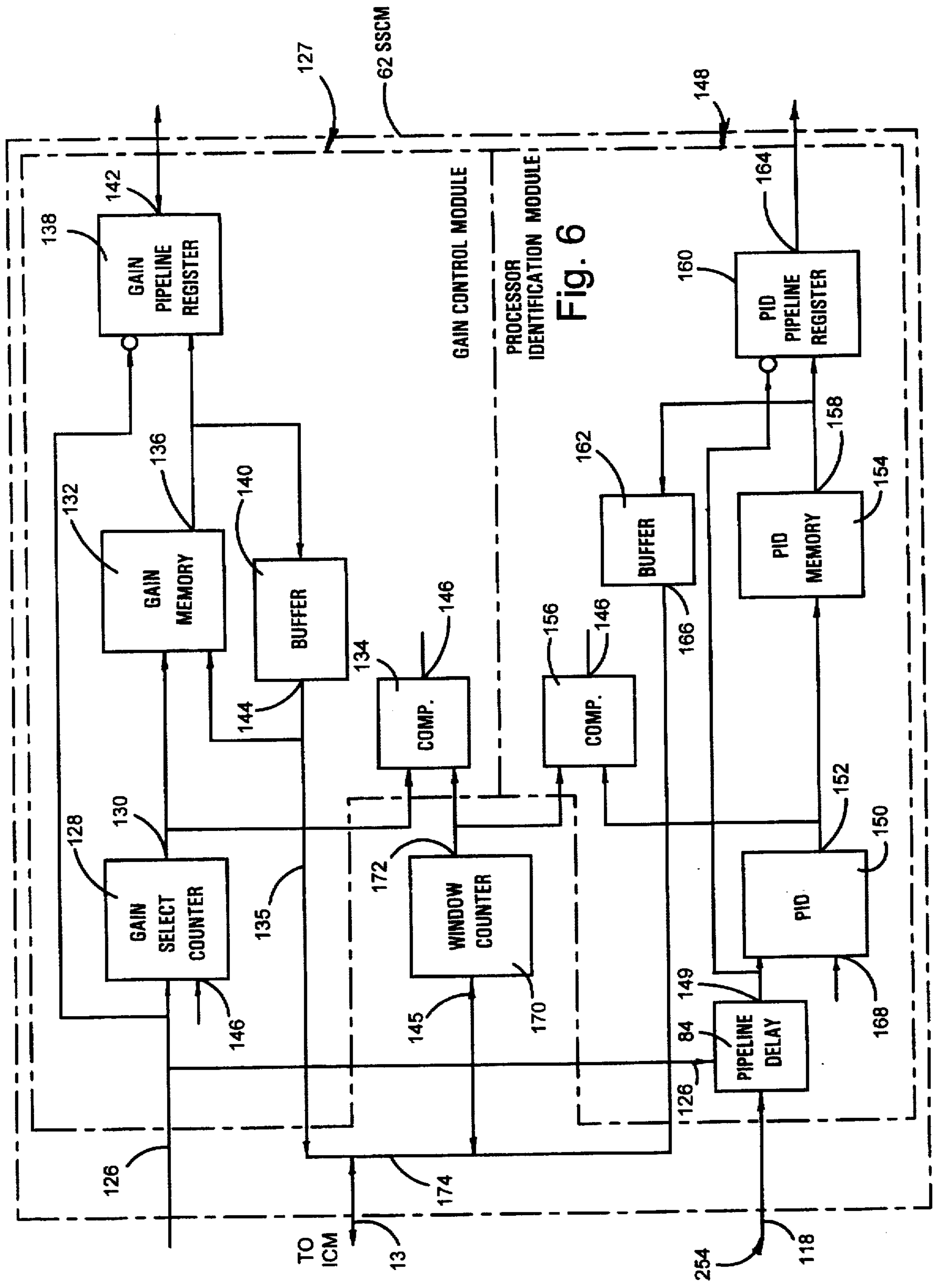
FIG. 6 is an electrical circuit in block diagram form generally illustrating a pre-amplifier gain control and processor identification circuit employed in the sequence and memory time base circuit.
Figure 7:
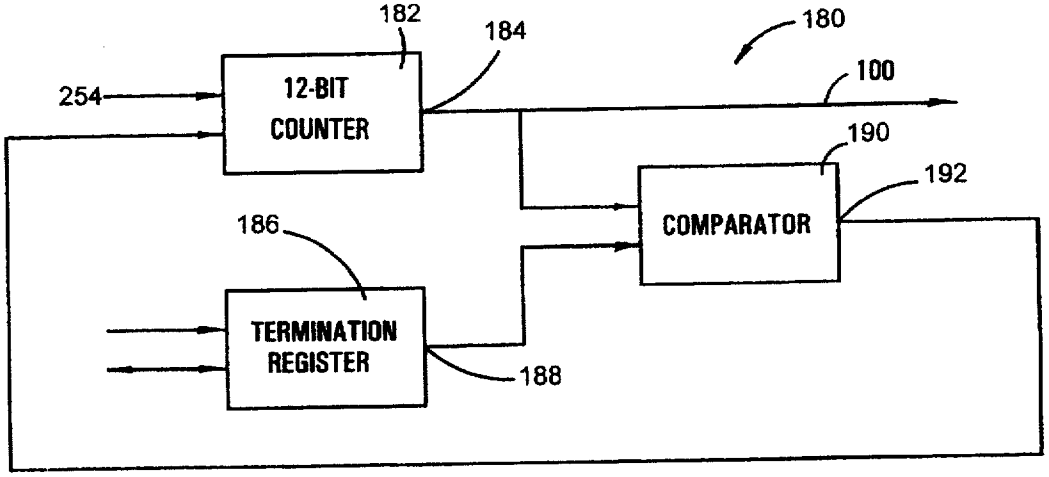
FIG. 7 is an electrical circuit in block diagram form generally illustrating a TOF mass spectrometer period counter employed in the sequence and memory time base circuit.

The ion detector circuit 42 (FIG. 1) detects ions within the TOF mass spectrometer 12 and provides analog signals to input 24. In particular, detector 42 is a conventional ion detector 42 having an output 24 connected to pre-amplifier 40. Ion detector 42 may be any one of a number of detectors currently available, including microchannel plate detectors and secondary electron multiplier detectors. The pre-amplifier 40 acts as either a variable attenuator or a variable gain stage having a gain control input for receiving signals from gain control circuit 127 (FIG. 6) to selectively control the amplitude of signals output therefrom as described below. The output of the amplifier 40 is connected to the input 38 on data acquisition module 22.

Figure 3:
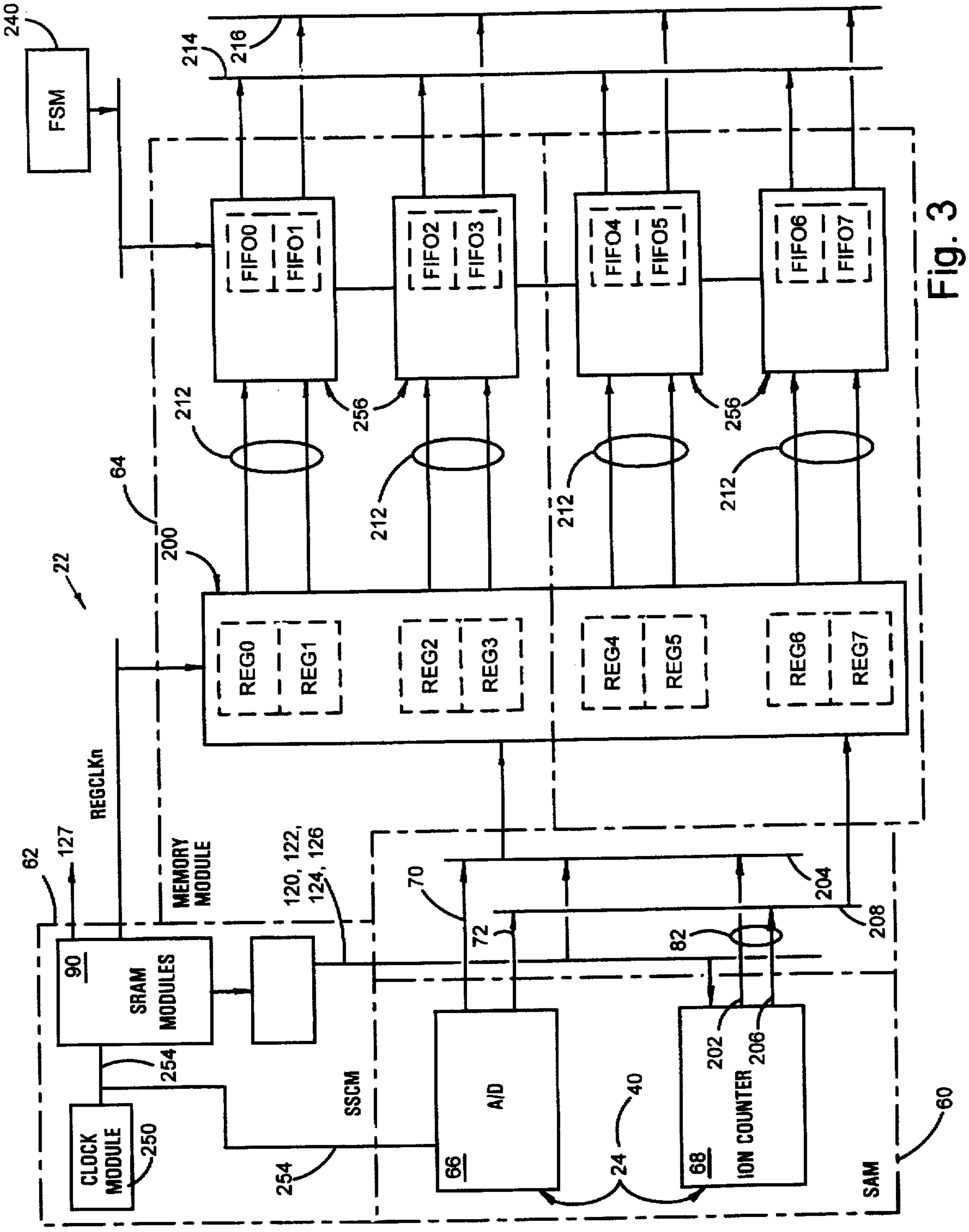
FIG. 3 is an electrical circuit diagram in detailed block form of a data acquisition module shown in FIG. 2.

FIG. 3 shows the components of DAM 22, which include a signal acquisition module (SAM) 60, and a sequence and storage control module (SSCM) 62, both providing data and control bits to a register or memory module 64. More particularly, SAM 60 includes an analog-to-digital (A/D) converter 66 and an ion counter 68 connected to pre-amplifier circuit 40 for receiving data from input 24 (FIGS. 3 and 4). In the preferred embodiment, A/D convertor 66 is a track and hold A/D converter, having an 8-bit output, and most preferably a 10-bit output capable of operating at a frequency on the order of 500 megahertz. The A/D converter 66 also includes two outputs 70, 72 upon which data are toggled for reasons which will become more apparent below. As seen in FIG. 4, parallel ion counter 68, shown by dashed lines, includes a discriminator amplifier 76 configured to receive the analog signal provided by input 24, as well as an analog threshold or reference signal provided on output 78 of a digital-to-analog (D/A) converter 80. The output analog signal level may be controlled by digital input signals provided by a signal processor to input terminals 81. If the input on line 24 equals or exceeds the level of output 78 applied to discriminator 76, a signal is output on 74 to counter 69, which, in turn, produces an output over 82 (202, 206, FIG. 3) to a pipeline delay circuit 84 (FIG. 4) to indicate that the signal threshold has been satisfied. For each input to discriminator 76 on line 24 which does not satisfy the threshold, a zero is output at 82 to pipeline delay circuit 84. However, ion counter 69 only produces an output at 82 when enabled by a signal applied at input 86 from the SSCM 62.

Figure 5:
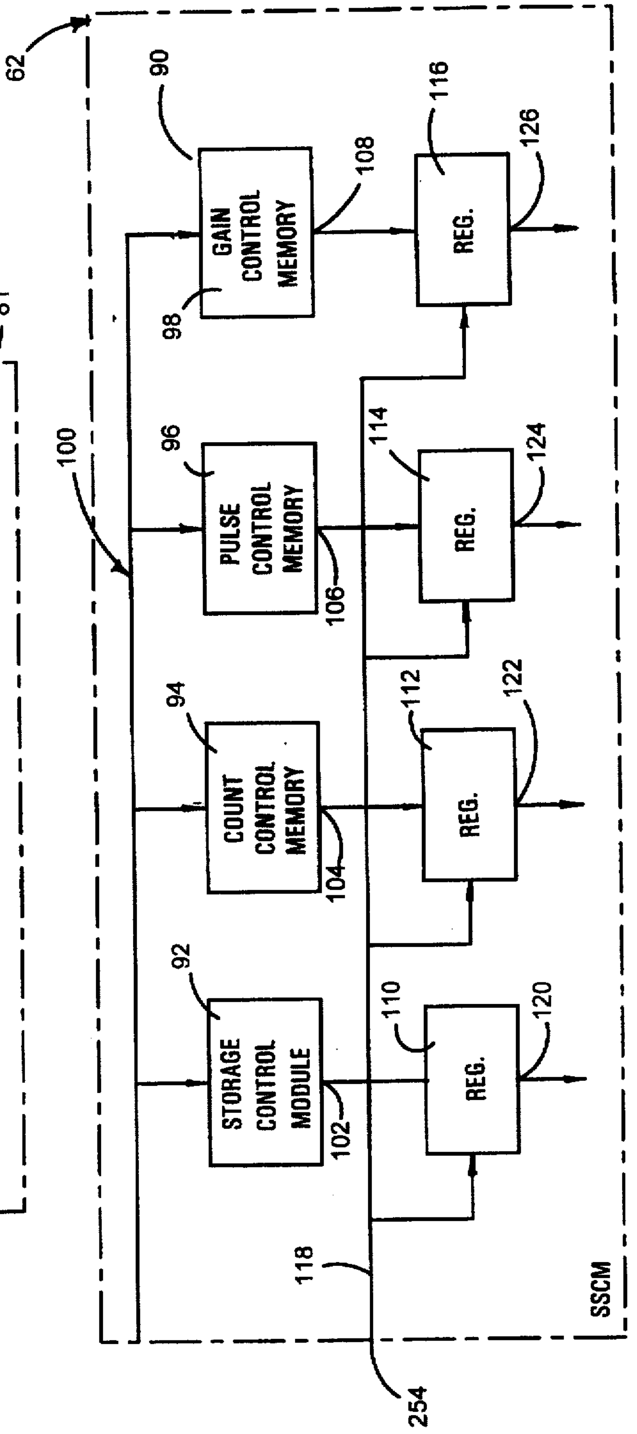
FIG. 5 is an electrical circuit in block diagram form generally illustrating a sequence and memory time base circuit employed in the data acquisition system shown in FIG. 2.

SSCM 62, shown in FIGS. 3 and 5 through 7, controls the collection of data from A/D convertor 66 and/or ion counter 68, as well as controlling the timing of the modulation, extraction, and deflection pulses in the TOF mass spectrometer. In addition, SSCM 62 controls the gain of the analog input 24 produced by pre-amplifier circuit 40 by providing a gain control signal to input 125 (FIG. 2). As seen in FIG. 5, SSCM 62 includes several static random access memory modules 90, including a storage control memory 92, a count control memory 94, a pulser control memory 96, and a gain control memory 98, each coupled to an address line 100 receiving programming data from ICM 32. Preferably, each memory module is capable of storing approximately 4000 different data strings, with each data string including eight or more data bits. Each bit of data stored in each of the memories represents a 2 nanosecond segment or sample of time. The outputs 104, 106, and 108 of each memory 94, 96, and 98, respectively, are connected to associated parallel-in, serial-out 8-bit registers 112, 114, and 116, respectively. Each register 112, 114, and 116 receives 500 MHz timing pulses from a clock pulse line 118. Each register is thus loaded with 8 bits of information every 16 nanoseconds and the data is transmitted from each register serially every 2 nanoseconds. The output 120 of register 110 includes an 8-bit word wherein each bit is sent to one of eight registers in 200, described in greater detail below. Each of these bits constitutes a store/discard signal which identifies the data in that particular register as data to be stored and later processed or data to be ignored.

The data loaded into static ram memories 90 are dictated by the ions of interest identified by the user in computer 27 interfacing with system 20 through ICM 32 via line 36. The particular projected arrival times of the ions of interest are determined by standard tables which are then used to identify what 2 nanosecond windows of data are to be collected. Output 120 from storage control register 110 is combined with data output on one or the other outputs 70, 72 of A/D convertor 66 and outputs 202, 206 from ion counter 68 onto a particular input of a register in 200 described below, to identify or tag the digital signal as one that is of interest and later stored for processing. For example, if a particular 8-bit segment of data is collected in a 2 nanosecond window wherein an ion of interest was to have arrived, the A/D digital signal as well as the ion count output would be temporarily stored in a specific register. One input of that register would have a "1" indicated thereon to flag this data as data of interest and should be retained. Data, wherein the specific register input contains a false or zero value, is not saved. In a similar fashion, a positive value or "1" occupies the same bit location in the count control memory output at 122 from control register 112 at the same time as the "true" or "1" to collect and store the A/D data. The output from register 112 enables ion counter 68 at input 86, described briefly above.

The values stored in 94 need to take into account the pipeline delay of A/D converter 66. Note that the pipeline delay of ion counter 68 is also matched to the pipeline delay of A/D converter 66. Data is output in a similar fashion from pulse and gain control registers 114, 116, respectively, to control the timing of the modulation, extraction, and/or deflection pulses in the TOF mass spectrometer and the pre-amplifier gain to the circuit 40.

SSCM 62 (FIG. 3) includes a gain control module 127 (FIG. 6) for controlling the gain of pre-amplifier circuit 40 over a given time interval, as well as a processor identification module 148 for directing which one or more processors in SPM 26 will be responsible for processing the data. In particular, gain control module 127 includes a gain select counter 128 receiving an input from output 126 of gain control register 116 described above. The input over 126 toggles gain select counter 128 to produce an output at 130 connected in parallel to a gain memory 132 and a comparator 134. Gain memory 132 contains gain information for each data collection window to be collected by system 20. The gain information stored in memory 132 is determined by the first few spectra samples analyzed. Where the gain of a particular window caused a clipping of data, or was insufficient or weak, the gain is compensated for by setting the gain to the appropriate level. The corrected gain levels are programmed into the gain memory 132 over line 135 connected to ICM 32. Each time gain select counter 128 is toggled, the output at 130 causes gain memory 132 to select a new gain value for the next or appropriate data window. The output or new gain value at 136 is connected in parallel to a gain pipeline register 138 and a read back buffer 140. The appropriate gain value for pre-amplifier circuit 40 is output at 142. The output at 144 produced by buffer 140 may be transmitted over line 135 to ICM 32 over line 13 for the purposes of diagnostics. Gain select counter 128 is reset after a particular number of gain settings corresponding to the number of data windows is completed. A window count 170 is pre-programmed by ICM 32 over lines 13 and 145 to correspond to the number of inputs at gain select counter 128. Window count 170 outputs a signal indicating the number of data windows collected which is compared to the output 130 from gain select counter 128. When the output at 130 equals that output at 172, an output 146 causes gain select counter 128 to reset to zero and begin again. As briefly mentioned above, processor identification module 148 identifies which one or more processors in SPM 26 is responsible for processing the data collected by system 20. Additionally, module 148 also records the gain setting at the time that a data sample was recorded.

Many high speed A/D converters use a technique known as "pipelining." In this technique, the A/D converter 66 takes a sample at a certain time interval, i.e., every 2 nanoseconds. But when a particular sample is output from the A/D converter 66, as much as 30 nanoseconds may have transpired and the gain at the time of output may be different. To ensure that the proper gain setting is married to the correct data sample, a pipeline delay 84, connected to input 126 and to clock pulse line 118, has stored therein a value representing the delay inherent in the A/D converter 66. An output 149 of pipeline delay is connected to a stored gain and processor identification (PID) counter 150, which, when toggled by output 149, produces an output 152 received by stored gain and PID memory 154. Stored gain and PID memory 154 contains the same information as contained in gain memory 132 described above, but the output 158 connected to stored gain and PID pipeline register 160 is delayed from the gain changes set to the pre-amp on 142 by the stepping-index or delay inherent in the A/D convertor 66. The output on 158 also identifies the particular processor in SPM 26 responsible for receiving and processing the data sample. The PID tag attached to the gain information and output by memory 158 is also preassigned by the programming in ICM 32 according to the number of processors within SPM and the number of data samples to be tagged, stored, and processed. Presently, the preferred embodiment of the invention will allow the user to snap-fit in the described number of processors much like computer cards are snapped into PCs. Just as with the digital data of the signal, the ion count bit, the store/discard bit, gain information, and PID designator are added to the data stream of each sample collected.

Also comprising a portion of the SSCM 62, and more specifically, a portion of pulser control memory 96 and register 114, is a TOF mass spectrometer period counter module 180 (FIG. 7) configured to control or regulate the cycle time or period of the TOF mass spectrometer. In particular, a counter 182, preferably a 12-bit counter, receives a pulse clock input, or PCLK, from a clock generation circuit described below. The output 184 of counter 182 is connected to a comparator 190 and to line 100 providing the acquisition and storage control address to each of the static ram modules 90 described above. As each clock pulse PCLK toggles counter 182, the output at 184 is increased by one to memories 92, 94, 96, and 98, causing each to output an 8-bit word of data from each location every 16 nanoseconds. However, if it is preferred that the TOF mass spectrometer have a period of 20 microseconds, counter 182 will make up to 1250 counts to complete a 20 microsecond period, for each count identifies an 8-bit location in each memory in static ram 90, for a total of 10,000 bits. Since each bit location corresponds to a 2 nanosecond segment of time, the total time constitutes the 20 microsecond period. The counter 182 is reset by the value stored in a termination register 186 having an output connected to comparator 190. When the count and the termination count are the same, output 192 on the comparator resets counter 182.

Referring again to FIG. 3, system 20 includes a memory module 64 which is configured to receive all of the data digitized by A/D converter 66, ion counter 68, and the accompanying labeling data provided by SSCM 62. In particular, and in reference to FIGS. 3 and 8 through 10, memory module 64 includes a plurality of registers 200, preferably emitter coupled logic to transistor-transistor logic (ECL/TTL) registers. As FIG. 8 suggests, it is preferred that eight registers 200 be used, each designated REG0 through REG7 and arranged in parallel. Registers REG0 through REG7 are connected to the outputs 70, 72 of A/D converter 66, outputs 202, 206 of ion counter 68, and to the outputs 120, 164 of registers 110, 160 (FIG. 5). These outputs provide the store/discard bit 110, the 10-bit A/D signal 70, 72, the ion count bit 202, 206, the 4-bit gain signal 164, and the 2-bit PID signal 164 described above.

To reduce the duty cycle of the memory module 64 and to increase the period of the TOF mass spectrometer, it has been found that if the data from A/D converter 66 and ion counter 68 are divided among many registers and processed in parallel, the objectives of the invention can be achieved. Accordingly, it is preferred to connect output 70 of A/D convertor 66, as well as the even output from ion counter 68, shown schematically in FIG. 3 as output 202, onto a bus 204 connected to EVEN registers, designated REG0, REG2, REG4, and REG6 (FIG. 8). Also connected to this bus and the appropriate inputs on the EVEN registers are the sequencing and storage control data including the store/discard bit, the gain bits, and the PID bits. Likewise, the ODD outputs, including output 72 on A/D convertor 66, output 206 of ion counter 68, and the associated sequencing and storage control data, are connected to bus 208 interconnected to the ODD registers designated REG1, REG3, REG5, and REG7. Additionally, each of the registers 200 are connected to a dedicated clock output, generally designated REGCLKn where n is the register number. As briefly mentioned above, the storing of each data sample on one of the eight registers 200 reduces the operation bandwidth requirements from 500 MHz to 62.5 MHz per register. At this point, it is also preferred to convert the character of the signal from ECL to TTL in order to account for the greater availability of TTL logic components. It is contemplated ECL logic may be used throughout; however, certain components may need to be customized in order to carry out the operations.

Interconnected to the outputs of the registers 200 are TTL logic FIFO memories 210, each dedicated to a respective one of the registers REG0 through REG7 (FIGS. 9 and 10). For the purposes of this discussion, a particular register 210 is identified by the designation FIFOn, wherein n represents the FIFO address and corresponds to one of the eight registers described above. Each FIFOn receives the output of its register REGn across a dedicated hardwired bus or data line generally indicated as numeral 212. Each FIFOn memory preferably includes an 18-bit register having 256 addressable locations. As each FIFOn begins to receive data, the data from each FIFOn are read out sequentially according to FIFO address onto EVEN and ODD data buses 214, 216, respectively. Registers 218, 220 interconnect the outputs 222, 224 of the EVEN and ODD FIFOs, respectively, through their output 226, 228 to the EVEN and ODD data buses 214, 216.

The transfer of data from FIFOn to the EVEN and ODD buses 214, 216 is controlled by an autonomous finite state machine (FSM) 240, shown in FIG. 3 above memory module 64. FSM 240 detects the presence of data in FIFOn, and causes the data to be read out onto the data buses 214, 216. If data is present in all FIFO registers 210, FSM 240 will readout data from the EVEN and ODD FIFOs simultaneously. For each group of ODD and EVEN FIFOs, the data will be read sequentially from each FIFO. For example, FIFO0 location 0, FIFO2 location 0, FIFO4 location 0, etc. The data are sequentially output onto EVEN bus 214. At the same time, FSM 240 reads data from the ODD FIFOs sequentially; for example, FIFO1 location 0, FIFO3 location 0, FIFO5 location 0, etc. This data is output onto data bus 216 parallel simultaneously with the data from the EVEN FIFOs.

The timing of all operations transpiring within system 20 is based upon a clock pulse produced by SSCM 62. In particular, SSCM 62 includes a clock module 250 having an oscillator 252 operating at a predetermined frequency (see FIGS. 13 and 14). In a preferred embodiment, oscillator 252 generates a 500 MHz signal output at 254 to the various components. The 500 MHz signal output at 254 is connected to A/D converter 66 (FIG. 4) and pipeline delay register 84 (FIG. 5), as well as counter, pulser, and gain control registers 122, 124, and 126, respectively, through line 118. In addition, output 254 is connected in parallel to a JOHNSON COUNTER 256, operating at the same frequency, and to a frequency divider 258. Frequency divider 258 produces an output pulse at 260 equal to ⅛ of the clock pulse, or 62.5 MHz. Output 260, in turn, is connected to a clock generation circuit 262. The outputs, generally designated as 264 and 266 for each of the respective counters 256, 262, provide the appropriate clock pulse to the appropriate device within DAM 22.

Referring to FIG. 2, SPM 26, operably connected to receive data from DAM 22, initially processes the data and outputs the data over bus 13 to ICM 32. More particularly, and in reference to FIG. 12, SPM 26 includes one or more processors, such as shown, generally designated as digital signal processors and accumulator cards (DSPAs). Although it is contemplated that one DSPA 270 may be adequate in some operations, more than one DSPA is preferred and most preferably four such cards are used, each addressable as DSPA0, DSPA1, DSPA2, and DSPA3, in accordance with the digital address assigned to each digital signal by the PID module 148 described above. However, for the purpose of this description and clarity only one DSPA is shown.

Each DSPA is responsible for the first stage processing of the data from A/D convertor 66. As each data word or signal is transferred to the respective DSPA, it is received by either its EVEN or ODD input FIFO 274 before being output at 276. The data output at 276 is separated into A/D-gain data and ion-counter-gain data. The two digital signals are sent down separate paths along output 280 with each portion maintaining its own tag or label. The data from A/D converter 66 is used in case the ion counter 68 data does not satisfy a particular parameter described below. This is done to prevent using invalid data from the ion counter 68. The software running on the microprocessor 306 will determine if the ion counter data is valid by verifying that the number of ions (counts) per second was small enough that there was a low probability that more than one ion had struck the detector at a time. This ensures that the ion counter was not saturated.

In a preferred embodiment of the invention, the data from A/D convertor 66 are adjusted at 282 using the value of the gain. This justification of the data ensures that all samples are equalized to the same reference. Justification occurs preferably after the data passes through a look-up table module 286 and output at 284. The adjusted value from A/D convertor 66 are output at 288 to a digital discriminator 290 where the data are compared against a programmed threshold. If the data value is less than the threshold, the data are discarded. If the adjusted value meets or exceeds the threshold, then the data are output at 292 to the accumulator portion 294 of the DSPA. The accumulator portion of DSPA includes an adder 296 receiving the adjusted value from output 292. Adder 296 is indexed by the data transfer and the adjusted value is added to a previous value stored at this location in a static random access memory (SRAM) 298, output over 300 to adder 296. The result of the addition is then stored in SRAM 298. In this manner, samples of a given analyte which were collected over many spectra are summed together. This process continues until the result from the addition causes an overflow condition or until a sufficient number of samples have been collected. A "sufficient number" of samples is determined by the particular program parameters set by the operator.

When the data from accumulator 294 are output, either because the accumulator is about to overflow or upon a command, the data are output at 300 to a bus 302 connected to interface module 310. The purpose of accumulator interface 310 is to transfer the results accumulated thus far to the microprocessor on the DSPA card. This function allows the transfer to take place without missing any of the incoming data from DAM 22. Some accumulators require some "dead time" to transfer their results. This causes some number of samples to be lost while the accumulator transfers it results. Once the data have been transferred to the processor 306, then the software which processor 306 is executing will continue the process of accumulating. In addition this software will examine the A/D data and ion-counter data and decide which of them is valid as described above. If the data from the accumulator are the first samples, then the software running on the DSPA will determine the gain settings to be used and pass this information to the ICM. This data will then be discarded. If the gain settings have already been determined, then the data from the accumulator will be summed to the data previously collected by the DSPA. This data will be summed in such a manner as to maintain the chronological order. Once the DSP has collected all of the data required, then it will be transferred to the ICM via bus 13.

DSPA 270 further includes a read-only, non-volatile memory (ROM) module 304 operably connected to bus 302 and microprocessor 306. Microprocessor 306 interrogates ROM 304 as well as DSPA 270 according to the program stored therein. Data gathered by microprocessor 306 are stored in a second SRAM 308 also connected to bus 302. Bus 302 is operably connected or otherwise in communication to accumulator circuits through the accumulator memory interface module 310 and a bus interface 312, respectively, both of which permit data transfer thereacross. Bus interface 312, in turn, is connected to a bus interface module 314, such as a VME bus, and a shared memory 316 through line 318, which permits two-way communication through interface 312 to microprocessor 306. Bus interface 314, in turn, is connected in two-way communication through line 320 to a VME bus 13 in a conventional manner. VME bus 313 is operably connected to ICM 32 which provides programming commands and instructions to the various modules or systems comprising the data acquisition system embodying the invention.

ICM 32 (FIG. 13) is responsible for setting up all of the data acquisition parameters. Many of the parameters are dictated by the program within the PC connected thereto. Other parameters, such as gain settings for the pre-amplifier 40, will be established by ICM 32 after the first few samples are collected at the beginning of each analysis. After setting up the acquisition system, ICM 32 initiates the analysis, supervises the determination of the pre-amp gain settings, instructs the DSPA cards to begin processing and storing data, collects the data from the DSPAs, and performs the final processing steps on the data. When requested, it will send the data to the PC. Additionally and simultaneously with the above tasks, ICM 32 is also responsible for seeing the overall operation of the TOF mass spectrometer. These functions are discussed in a co-pending patent application assigned to the assignee of this invention.

ICM 32, shown in FIG. 2, interfaces through the VME bus 13 with the DSPA 270 and DAM 22. This allows ICM 32 to test DSPA 270 and DAM 22 for diagnostic purposes, configure these components for data acquisition, and collect the results from these modules after dam acquisition has been completed. The VME bus interface 13 also allows DSPA 270 to access the shared memory 310A on ICM 32. Shared memory 310A includes a dynamic random-access memory controller 312A which controls access to dynamic random-access memory 314A having a capacity ranging between 4 and 256 megabytes. In addition, VME interface 311 permits interprocessor communication to take place with DSPA 270 via a set of dedicated registers in the VME bus interface 311. Also operably connected with the VME interface 311 is a DMA and data convertor 316A provided to transfer the results collected by ICM 32 to the PC 27 (FIG. 1) over bus 36. This dedicated hardware will autonomously read data from shared memory block 310A, convert a specified portion of the data from the digital signal processor format to the personal computer format, and send it to the HSL block 318A. HSL block 318A then uses a proprietary, high-speed serial interface 36 to transmit the results to the PC 27. ICM 32 also provides a digital signal processor 320 operably coupled via bus 321 to the VME bus interface 311 through a DSP interface 322. Also operably connected to bus 321 is a static, random access memory (RAM) 323 as well as a flash memory 324, which provide program and data storage for DSP 320. Flash memory 324 is preferably a firmware chip which may be electrically programmed and erased and may contain as much as one-half megabyte of storage capacity to provide program information to DSP 320. The static RAM 323 serves to provide buffer space for data to and from the DSP as well as storing additional operational software downloaded from the flash memory 324.

Connected in parallel to an 8-bit input/output (I/O) bus 326 is a non-volatile RAM 328 for storing constants, a dual universal asynchronous transceiver 330 which, in turn, is operably connected to an RS-232 transceiver which is used to provide and receive signals from the source 14, as shown in FIG. 1 for the TOF mass spectrometer. Also connected to bus 326 is an NI interface 332 configured to communicate with all of the other modules of the TOF mass spectrometer through line or bus 23, mentioned above and shown in FIG. 1. Also connected to bus 326 is a control and status register provided to retain data generated during parity checks and error information during the operation of the system. It is noted that the 8-bit I/O bus 326 is connected to a local I/O port 336 to bus 321 such that data may be exchanged between DSP 320, shared memory 310, and other memory components of ICM 32. It is noted that 8-bit I/O bus 326 is also operably connected to the HSL 318 through a bus 338 to enable direct transfer of data between the NV RAM 328, dual universal asynchronous transceiver 330, and NI 332.

In operation, and in reference to FIGS. 14 and 15, the particular data parameters to be recorded and collected are preprogrammed into the data acquisition system 20 through software commands provided from the PC to ICM 32 which, in turn, transfers those commands to the respective components and modules comprising system 20. Upon the receipt of the first few transient ion pulses accelerated down the TOF mass spectrometer and received by the detector 42, the gain of the analog signals produced therefrom are automatically adjusted by gain control module 127 (FIG. 7) and stored in gain control memory 98. Thus, in effect, the gain is self-adjusting to satisfy a particular range or threshold.

Subsequent to the self-calibration of the gain determined by programmed thresholds and the gain control modules 127, each analog signal produced by detector 42 is convened to a digital signal at A/D convertor 66 and/or into an ion count signal at ion counter 68 (FIG. 4). As briefly mentioned above, ion count signal must be of sufficient strength to register, as determined by the discriminator 76 and reference 80. The two signals, A/D and ion count signals, are passed to the digital acquisition module 22 where they are identified, tagged, or labeled as digital data occurring in one or more specific 2 nanosecond windows of time. Each 2 nanosecond window is calculated by one cycle of the 500 MHz clock pulse (see FIG. 14).

Upon each 2 nanosecond cycle occurrence, A/D convertor 66 flip-flops, alternating data output onto buses 70, 72 at a frequency of 250 MHz, as indicated by the alternating valid boxes identified on time lines DATA_A and DATA_B. The data output from A/D convertor 66 and ion counter 68, as well as the storage and control bits provided by the SSCM 62, are stored temporarily on the registers, dictated by the actuation of the particular register REGn 200 (FIG. 8). With a preferred number of registers REGn, most preferably where n=8, all registers are full after a 16 nanosecond time interval. While in registers REGn, the data undergo a character change, preferably from an ECL signal (high of −0.8 volts and low of −1.6 volts) to a TTL signal (high of 2.5 volts and low of 0.0 volts) which essentially amounts to an amplification and shift in the data signal. Once all the registers REGn are full, the data are transferred in parallel over the dedicated buses 212 to a respective FIFOn. It is at this point that the store/discard bit or label issued to save the data in FIFOn and pass it on to SPM 26 or discards the data by allowing to be overwritten in REGn on the next cycle. The store/discharge bit n is connected directly to FIFOn write enable, thereby directly controlling the storage of a given data sample.

Data output from FIFOs 210 are output in a parallel fashion from the ODD and EVEN numbered FIFOs onto parallel buses 214, 216 to a predetermined one of the DSPAs 270 dictated by the address or PID assigned to the data package by SSCM 62 in DAM 26. This process is substantially controlled by FSM 240 which continually reads the data input into each FIFOn and dictates which data are read from the FIFOs for transmission to SPM 26. Each DSPA pre-processes the data, including adjusting the data to a baseline gain value, called justification, so they may be summed. The data are then stored and output as dictated to the ICM 32 and associated operated controlled software. After being output to the ICM, the data is then transferred to the PC.

Data acquisition system 20 described above contained multiple microprocessors or digital signal processors in ICM 32 and DSPA 270. The multiple digital signal processors provide hardware support for indivisible, read-modify-right operations which are used to access software semaphores. These software semaphores are, in turn, used to guarantee exclusive access to shared hardware and software resources. For example, digital signal processor 306 on DSPA card 270 simultaneously processes data transferred from the accumulator portions 271, 272 while the same sections continue the process of accumulating data. Simultaneously, digital signal processor 320 and ICM 32 (FIG. 13) process the data and interface with the PC, sometimes converting data stored in the shared memory 310 prior to transmission over the HSL 318, 36, controlled by DMA and data convertor 316.

The advantages provided by or resulting from the data acquisition system and method embodying the invention include the ability to collect and process data at nearly twice the rate conventionally available. Additionally, resolution is significantly improved as a result of collecting larger segments of data over a shorter time interval than previously available. This results in sharper and better defined data sets than previously available, making it possible to discriminate between ion species of class mass-to-charge ratios previously undetectable. Furthermore, the data acquisition system and method embodying the invention provide the further advantage of ensuring that all of the particular data of interest are collected since all data are digitized and temporarily stored. In this manner, data are not lost as a result of powering up a system or digitizing circuit just after the ions of interest have already been partially detected.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A system for detecting ions of interest in a time-of-flight mass spectrometer, comprising in combination:

a signal acquisition circuit for detecting ions as a function of time and generating output signals indicative thereof;

a sequence and storage control circuit for marking said output signals as said function of time as signals to be stored and signals to be ignored;

a buffer circuit for storing said signals to be stored; and a digital signal processor circuit receiving said signals stored in said buffer circuit for processing and generating an output indicative thereof.

2. The data acquisition system as defined in claim 1, further including an instrument control module for controlling said sequence and storage control circuit and identifying which output signals are to be tagged.

3. The data acquisition system as defined in claim 2, wherein said signal acquisition circuit includes:

an analog-to-digital converter circuit;

an ion counter circuit; and an ion detector disposed within the time-of-flight mass spectrometer and having an output interconnected in parallel to inputs in said analog to digital converter circuit and said ion counter circuit.

4. The data acquisition system as defined in claim 3, wherein said analogy-to-digital convertor circuit is comprised of a single analogy-to-digital converter.

5. The data acquisition system as defined in claim 3, wherein said analogy-to-digital converter circuit is comprised of two or more sequentially clocked analogy-to-digital converters.

6. The data acquisition system as defined in claim 3, wherein said sequence and storage control circuit includes:

a count control circuit for enabling said ion counter circuit at a programmed time; and a storage control memory for marking said output signals at said programmed time.

7. The data acquisition system as defined in claim 6, wherein said digital signal processor circuit includes:

a circuit for successively summing said marked signals over said programmed time; and a memory for storing the summed marked signals to create a spectra.

8. The data acquisition system as defined in claim 7, wherein said ion counter circuit includes a discriminator circuit for establishing a signal threshold level.

9. The data acquisition system as defined in claim 8, wherein said signal acquisition circuit includes an amplifying circuit disposed between said ion detector and said analog-to-digital converter circuit and said ion counter circuit for adjusting an analog signal received from said ion detector.

10. The data acquisition system as defined in claim 9, wherein said signal acquisition circuit controls gain settings of said amplifying circuit for each signal to be converted and marked, allowing each ion of interest to have a different gain setting.

11. A method for detecting at least one ion in time-of-flight mass spectrometry, comprising the steps of:

receiving a plurality of ions at an ion detector;

generating a plurality of output signals in response to said ions received by said ion detector as a function of time;

marking said plurality of output signals as a function of time as signals to be stored and signals to be ignored; and summing said signals to be stored as a function of time.

12. The method as defined in claim 11, further including the step of determining, as a function of mass-to-charge ratio of an ion, which signals are to be stored and which signals are to be ignored.

13. The method as defined in claim 11, further including:

storing said plurality of marked output signals in a first memory and discarding said output signals to be ignored by overwriting them with new signals; and transferring said plurality of output signals to be stored from said first memory to a second memory.

14. The method as defined in claim 13, wherein the step of storing said plurality of marked output signals in a first memory includes:

alternating said plurality of marked output signals onto parallel data buses;

storing said output signals in parallel registers; and transferring said output signals from said parallel registers to dedicated FIFOs.

15. The method as defined in claim 14, wherein said output signals in each of said dedicated FIFOs are output sequentially in parallel to a digital signal processor.

16. The method as defined in claim 11, wherein the step of generating a plurality output signal includes:

producing an analog output signal from said ion detector as a function of time in response to ions received by said ion detector; and converting said analog output signal to a first and second digital signal.

17. The method as defined in claim 16, wherein the step of producing said analog output signal includes adjusting the gain of said analog output signal continuously using a self-correcting circuit.

18. The method as defined in claim 11, wherein the step of marking said plurality of output signals includes the steps of:

converting signals from said ion detector to digital signals as a function of time;

selecting a time interval of interest; and adding a bit to said digital signals to identify said digital signals as occurring within said time interval, said bit identifying said digital signals as ones to be stored or ignored.

19. The method as defined in claim 18, further including adding a bit to said digital signals to be stored to identify an address of a processor for summing the stored digital signals.

20. An apparatus for detecting find quantifying at least one ion species from a spectra of ions in a TOF mass spectrometer, comprising in combination:

an ion detector circuit in the time-of-flight mass spectrometer for receiving the spectra of ions, said ion detector circuit producing output signals as a function of time in response to the receipt of said spectra of ions;

a data acquisition circuit receiving said output signals from said ion detector circuit for tagging said output signals as a function of time as signals from said at least one ion species and as signals to be ignored; and a signal processor circuit for summing said signals from said at least one ion species and producing an output indicative thereof.

21. The apparatus as defined in claim 20, further including an instrument control circuit operably interconnected to said signal processor circuit, said data acquisition circuit, said ion detector circuit, and the time-of-flight mass spectrometer for receiving data therefrom and providing programming control commands thereto.

22. The apparatus as defined in claim 21, wherein said ion detector circuit includes:

an ion detector selected from the group consisting essentially of secondary electron multiplier and microchannel plate detectors;

a pre-amplifier operably connected to said ion detector and having a gain control input; and a gain control circuit operably coupled to said gain control input for dynamically attenuating or increasing the gain of said pre-amplifier in response to previously received signals.

23. The apparatus as defined in claim 22, wherein said data acquisition circuit includes:

a signal acquisition module operably coupled to receive input signals for said ion detector circuit;

a sequence and storage control module operably coupled to enable said signal acquisition module; and a memory module interconnected to said signal acquisition module and said sequence and storage control module for temporarily storing signals from said signal acquisition module as controlled by said sequence and storage control module.

24. The apparatus as defined in claim 23, wherein said signal processor circuit includes:

at least one signal processor circuit and at least one accumulator circuit, said at least one signal processor circuit adjusting the gain value of the signal to a common reference and comparing the adjusted value to a programmed threshold, said at least one accumulator circuit summing the adjusting value meeting or exceeding said programmed threshold.

25. A data acquisition system for a time-of-flight mass spectrometer, comprising:

a signal acquisition module for continually digitizing an output from a transducer in the time-of-flight mass spectrometer and producing a digitized output including a plurality of digitized words, each representing an arrival of one or more ions;

a storage control module for identifying certain ones of said plurality of digitized words as words to be stored or discarded;

a memory module for selectively storing said certain ones of said plurality of digitized words for subsequent processing;

a signal processor module operably coupled to said memory module for summing and processing said certain ones of said plurality of digitized words;

an instrument control module operably connected to each of the modules set forth above for setting up all data acquisition parameters, initiating analysis of said digitized words, supervising gain control settings instructing said signal processor to begin processing and storing, collecting data from said signal processor module, and outputting the data on a display.

26. A method for quantifying one or more ion species of interest from one or more ion spectra produced from an analyte in a time-of-flight mass spectrometer, comprising the steps:

detecting the one or more ion spectra at an ion detector and producing analog output signals indicative thereof;

converting said analog output signals into at least one set of digital signals;

identifying certain ones of said digital signals as being one or more of the ions species of interest;

summing the certain ones of said digitized signals from each spectra; and producing an output of the summations.

27. A system for detecting ions of interest in a time-of-flight mass spectrometer, comprising in combination:

a signal acquisition circuit for detecting the ions and generating output signals indicative thereof, including an analog-to-digital converter circuit, an ion counter circuit, and an ion detector disposed within the time-of-flight mass spectrometer and having an output interconnected in parallel to inputs in said analog to digital converter circuit and said ion counter circuit;

a sequence and storage control circuit for tagging certain ones of said output signals as signals to be stored and signals to be ignored, including a count control circuit for enabling said ion counter circuit at a programmed time, and a storage control memory for tagging said output to signals at said programmed time;

a buffer circuit for storing said output signals tagged by said sequence and storage control circuit as signals to be stored; and a digital signal processor circuit for receiving said tagged signals from said buffer circuit for processing said tagged data, and generating an output indicative of said tagged signals, including a circuit for successively summing said tagged signals over said programmed time, and a memory for storing the summed tagged signals to create a spectra.

* * * * *

UNITED STATES PATENT AND TRADEMARK OFFICE

CERTIFICATE OF CORRECTION

PATENT NO. : 5,712,480
DATED : January 27, 1998
INVENTOR(S) : Michael C. Mason

It is certified that error appears in the above-identified patent and that said Letters Patent is hereby corrected as shown below:

Column 1, line 43;

"sampled" should be --sample--.

Column 1, line 48;

"scientist" should be --scientists--.

Column 3, line 58;

"them" should be --there--.

Column 11, line 44;

"convened" should be --converted--.

Column 13, claim 4, lines 21 & 22;

"analogy-to-digital" should be --analog-to-digital--.

Column 13, claim 5, lines 24 & 25;

"analogy-to-digital" should be --analog-to-digital--.

Column 14, claim 20, line 43;

"find" should be --and--.

UNITED STATES PATENT AND TRADEMARK OFFICE
CERTIFICATE OF CORRECTION

PATENT NO. : 5,712,480
DATED : January 27, 1998
INVENTOR(S) : Michael C. Mason

It is certified that error appears in the above-identified patent and that said Letters Patent is hereby corrected as shown below:

Column 16, claim 27, line 33;

delete "to" after "output".

Signed and Sealed this

Second Day of June, 1998

Attest:

BRUCE LEHMAN

*Attesting Officer*

*Commissioner of Patents and Trademarks*